United States Patent [19]

Burghardt

[11] Patent Number: 4,731,918

[45] Date of Patent: Mar. 22, 1988

[54] METHOD OF ATTACHING A CORNER PROTECTOR TO A TABLETOP OR THE LIKE

[76] Inventor: Donald J. Burghardt, Angell Rd., Silver Creek, N.Y. 14136

[21] Appl. No.: 13,963

[22] Filed: Feb. 12, 1987

[51] Int. Cl.[4] .............................................. B23P 19/00

[52] U.S. Cl. .................................. 29/526 R; 108/156; 248/345.1

[58] Field of Search ............... 248/345.1; 49/460, 462; 108/156, 157; 5/288, 314 B; 29/526 R

[56] References Cited

U.S. PATENT DOCUMENTS

| | | | |
|---|---|---|---|
| 2,995,863 | 8/1961 | Bright | 248/345.1 |
| 3,030,728 | 4/1962 | Wesman | 248/345.1 |
| 3,041,775 | 7/1962 | Brown et al. | 248/345.1 |
| 3,093,924 | 6/1963 | Pompa | 248/345.1 |
| 3,150,854 | 9/1964 | Jamieson | 248/345.1 |
| 3,762,626 | 10/1973 | Dorsey | 248/345.1 X |
| 3,960,354 | 6/1976 | Simikoski | 108/27 X |
| 4,072,231 | 2/1978 | Helms | 248/345.1 X |
| 4,240,225 | 12/1980 | Sartain | 248/345.1 X |
| 4,407,898 | 10/1983 | Kato et al. | 248/345.1 X |

*Primary Examiner*—Ramon O. Ramirez
*Attorney, Agent, or Firm*—Christel, Bean & Linihan

[57] ABSTRACT

A corner protector for a tabletop or the like includes a rigid protective body having a platen portion adapted to be received by a recessed region of a tabletop corner and a flange portion which extends generally to one side of the platen portion so as to depend generally downwardly over the tabletop edges at the tabletop corner when the protective body is operatively positioned upon the tabletop. The platen portion defines a plurality of countersunk apertures for the purpose of fixedly securing the protective body to the table with headed fasteners. Each countersunk apertures are sized to accept the head of a flat-headed fastener so that when the protective body is operatively attached to the table corner with the fasteners, the heads of the fasteners do not protrude above the platen portion. The shape of the platen portion is such that the conforming of the shape of the tabletop corner to the shape of a corner of the protective body intended to overlie the table corner is facilitated. The method of the invention includes the steps involved in attaching the corner protector to a corner of a tabletop or the like.

5 Claims, 6 Drawing Figures

METHOD OF ATTACHING A CORNER PROTECTOR TO A TABLETOP OR THE LIKE

BACKGROUND OF THE INVENTION

This invention relates generally to furniture and relates more particularly to a corner saver or protector for tabletops and the like.

There exists various guards and protectors for attachment to the corners of furniture pieces, such as tabletops, for protecting the furniture corner against damage. Commonly, such protectors include a portion for overlying an upper surface of the furniture adjacent a corner thereof and a depending flange or skirt portion for covering the side edges of the furniture adjacent the corner. Examples of such protectors are shown and described in U.S. Pat. Nos. 2,995,863, 3,041,775 and 3,960,354.

It is an object of the present invention to provide a new and improved corner protector for tabletops or the like and a method of attaching the protector to a tabletop.

Another object of the present invention is to provide such a protector for permanent attachment to the tabletop.

Still another object of the present invention is to provide such a protector facilitating the conforming of the tabletop corner to the shape of a corner of the protector intended to correspond therewith.

Yet still another object of the present invention is to provide such a protector which is well-suited for flush mounting at the corner of the tabletop.

A further object of the present invention is to provide such a protector which can be installed quickly and with relative ease.

A still further object of the present invention is to provide such a protector which is economical to manufacture and strong and effective in operation.

A yet still further object of the present invention is to provide a new and improved kit for protecting the corner of a tabletop or the like.

One more object of the present invention is to provide a new and improved table having protected tabletop corners.

SUMMARY OF THE INVENTION

This invention resides in a new and improved corner protector for a tabletop or the like having two adjacent edges which meet at a corner and a method of attaching the protector to a tabletop.

The corner protector is comprised of a rigid protective body including a platen portion adapted to overlie a tabletop adjacent the corner thereof and a flange portion extending generally away from one side surface of the platen portion. The platen and flange portions are so shaped that when operatively positioned upon the tabletop, the flange portion extends downwardly from the platen portion so as to cover at least a portion of the tabletop edges at the tabletop corner. The platen portion defines a plurality of apertures disposed thereover for receiving the shanks of headed fasteners for attaching the protective body to the tabletop.

The method of the invention includes the steps involved in attaching the protector of this invention to a tabletop. The steps of forming a recess in the upper surface of the tabletop adjacent the corner thereof for receiving the platen portion when the protective body is operatively placed upon the tabletop wherein the recess is about equal in depth to the thickness of the platen portion of the protective body. The protector is subsequently placed upon the tabletop so that the protective body is operatively accepted by the formed recess, and the protective body is secured to the tabletop with fasteners having shanks for extending through the platen portion apertures and heads for holding the platen portion against the tabletop.

BRIEF DESCRIPTION OF THE DRAWING FIGURES

DETAILED DESCRIPTION OF THE ILLUSTRATED EMBODIMENT

Figure 1:
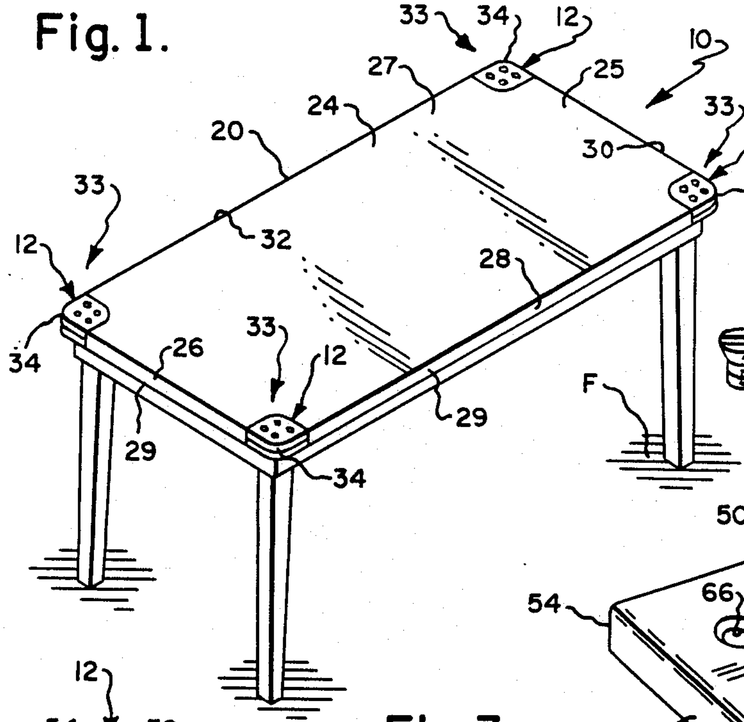
FIG. 1 is a perspective view of corner protectors in accordance with the apparatus of this invention shown operatively installed upon a table.

Turning now to the drawings in greater detail and considering first FIG. 1 there is illustrated a table 10 and four tabletop corner protectors 12,12, each in accordance with the apparatus of this invention and shown operatively attached to the table 10. The table 10 includes a substantially planar tabletop 20 in a spaced relationship with the floor F and so that the tabletop 20 is oriented substantially horizontally. The tabletop 20 defines a generally upwardly-directed support surface 24 defining an elevated planar surface portion 25 and side edges 26,28, 30 and 32 each oriented at generally a right angle to the upwardly directed support surface 24 and depending downwardly therefrom. The tabletop defines four corner regions, each indicated 33 in FIG. 1, and each of the tabletop side edges 26, 28, 30 or 32 meet its adjacent side edges at a rounded corner edge 34 as shown. A corner protector 12 overlies each of the tabletop corner regions 33 or 33 to protect the corner 34 from damage such as may result from an impact between a corner region by an object striking the region 33.

Figure 2:
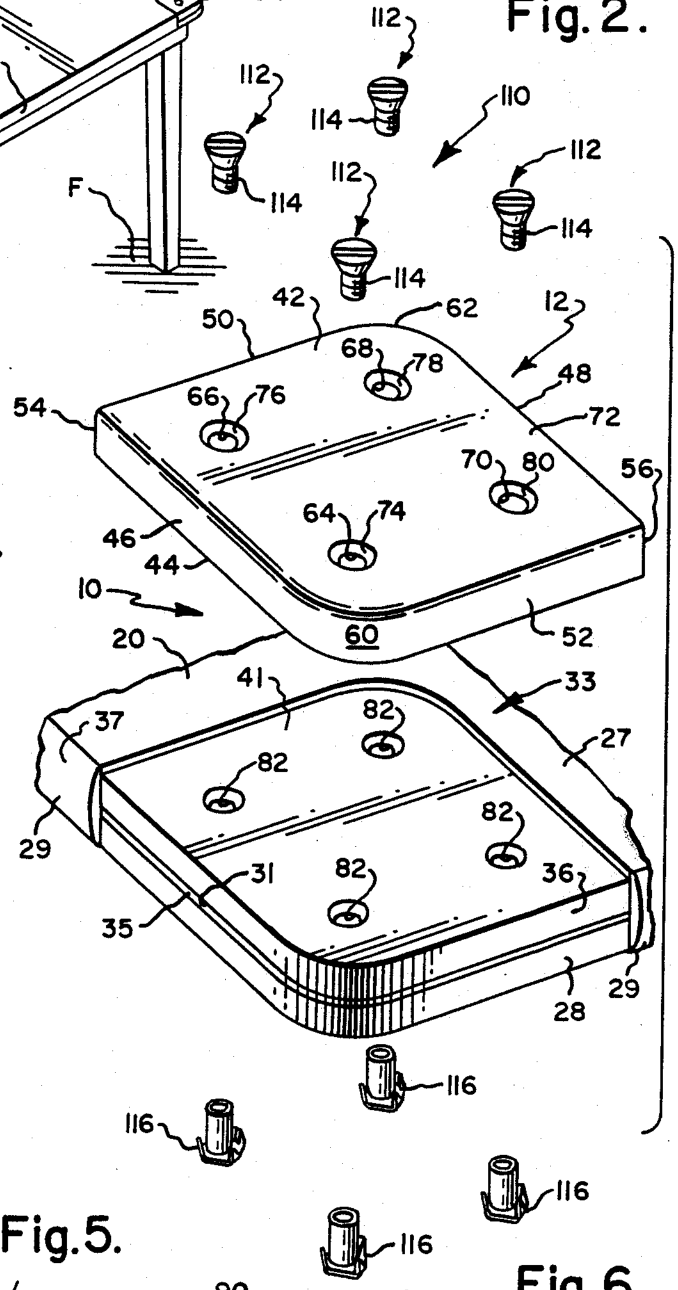
FIG. 2 is a fragmentary perspective view of the table and one of the protectors of FIG. 1 shown exploded.

With reference to FIGS. 1 and 2, the tabletop 20 includes a major central portion 27 constructed of wood and a border edge 29 constructed of plastic attached to the sides of the central portion 27. The border edge 29 is somewhat T-shaped in cross section with a leg 35 and a top section 37, and the central portion 27 defines a groove 31 along the side edges thereof within which the leg 35 of the border edge 29 is wedgedly secured so that the top section 37 faces away from the sides of the tabletop 20. With the leg 35 of the border edging 29 secured within the groove 31 so that the top of the T of the border edge 29 flatly engages the side edges of the central portion 27 in the manner shown in FIG. 2, the border edge 29 provides and thereby defines the side edges 26,28, 30 and 32 (FIG. 1) of the tabletop 20.

With reference still to FIGS. 1 and 2, each tabletop corner region 33 is shaped so that when a protector 12 is operatively positioned thereover, the protector 12 is flush-mounted thereupon so that selected ones of the protector surfaces, hereinafter defined, are substantially even with the elevated planar surface 25 of the tabletop 20 or an edge of the tabletop 20. To this end, each tabletop corner region 33 defines contours conforming to the general contours required to accept the protector 12 and provide the aforedescribed flush mounting. More specifically and as exemplified by the corner region 33 shown in FIG. 2, the upper surface 24 of the tabletop 20 is recessed adjacent the corner 34 thereof so as to define a recessed planar surface 41 arranged parallel to and generally below the elevated planar surface portion 25 of the upper surface 24, and the side edges 26 and 28 are cut out so as to define a recessed edge surface 36 as shown which is about equal in depth to the thickness of the top section 37 of the border edging 29. The recessed planar surface 41 has been formed in the tabletop 20 by a cutting operation, and the recessed edge surface 36 has been formed by cutting away from the remainder of the tabletop 20 a portion of the top section 37 of the border edging 29.

Furthermore, the tabletop 20 defines a plurality of holes 82,82 disposed over the recessed planar surface 41, and each hole 82 includes an upwardly-directed opening which has been countersunk.

Figure 3:
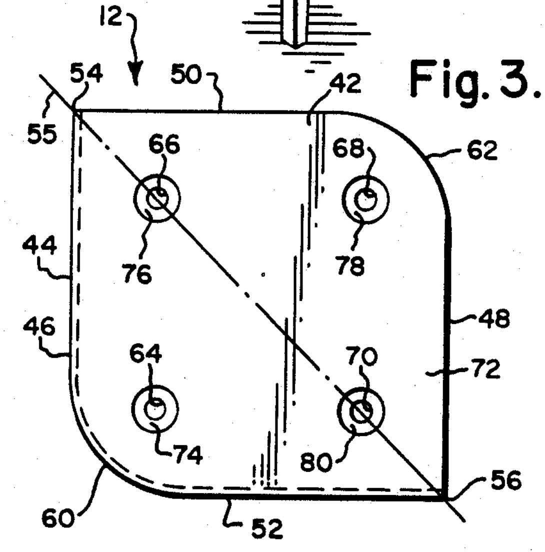
FIG. 3 is a top plan view of one of FIG. 1 protectors.

With reference to FIGS. 1–4 the protector 12 includes a platen portion 42 having two opposite side surfaces 72,73 and a flange or skirt portion 44 attached to the flange portion 32 platen portion 42 so as to extend generally away from the platen side surface 73. As best shown in FIG. 3, the platen portion 42 defines two opposite and parallel side edges 46,48 and two opposite and parallel side edges 50,52 arranged so as to provide the platen portion 42 with a somewhat square appearance. Each of the platen side edges 46 and 48 meets an adjacent edge 50 or 52, respectively, at a substantially right corner 54 or 56, respectively, and each of the platen side edges 46 or 48 meet the other adjacent edge 52 or 50, respectively, at a rounded corner 60 or 62, respectively. In accordance with the present invention and for a reason which will be hereinafter, the platen portion 42 is generally symmetrical about an imaginary line, indicated 55, drawn between the platen corners 56 and 58 so that the size, shape and radius of the platen corner 60 is about the same as that of the platen corner 62.

Figure 4:
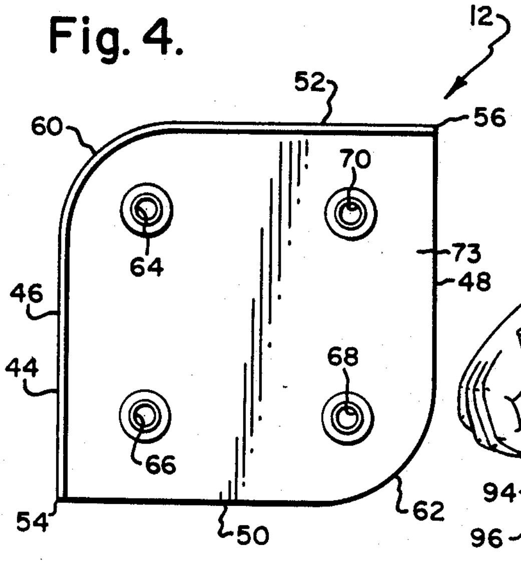
FIG. 4 is a bottom plan view of the protector illustrated in FIG. 3.

With reference still to FIGS. 3 and 4, the platen portion 42 defines a plurality of apertures 64,66, 68 and 70 which are disposed thereover so as to extend between the platen side surfaces 72,73. The regions, indicated 74,76,78 and 80, of the platen portion 42 defining the apertures 64,66, 68 and 70, respectively are countersunk so that each aperture-defining region 74,76,78 or 80 protrudes generally away from the platen side surface 73. In accordance with the present invention and for a reason which will be apparent hereinafter, the apertures 64,66, 68 and 70 are disposed over the platen portion 42 so as to be arranged generally symmetrically about the imaginary line drawn between the plate corners 56 and 68.

The flange portion 44 of the protective body 14 is joined to and extends along the platen edges 46 and 52 from the platen corner 54 to the platen corner 56. As best shown in FIG. 2, the width of the flange portion 44 as measured between the upper and lower edges of the flange portion 44 is relatively short in comparison to the length thereof.

With reference till to FIG. 2, the protective body 12 is positionable upon the tabletop 20 so that the countersunk regions 74,76,78 and 80 of the body 12 are nestingly received by the countersunk openings of the holes 82,82 disposed over the recessed planar surface 41, the side surface 41 of the platen portion 42 flatly engages the planar surface 41 and the flange portion 44 is received by the cutout formed in the border edging 29 so as to engage the edge surface 36 along the length thereof.

It follows from the above that the tabletop recess at each of its corner regions 33,33 is so sized to accept the protective body 12 positioned therein and the disposition of the countersunk holes 82,82 disposed over the planar surface 41 correspond or align with that of the countersunk aperture-defining regions 74,76,78,80 of the platen portion 42. Furthermore, when the protective body 12 is operatively received by the recess and edge cutout of the corner region 33 of FIG. 2, the protective body side surface 72 is even with, or coplanar with, the tabletop surface portion 25 and the protective body flange 44 is flush-mounted with the tabletop edges 26 and 28.

With reference still to FIG. 2, the protector 12 is attached to the tabletop 20 with suitable headed fasteners, indicated 110. The fastener embodiments 110 shown are in the form of T-nuts 112,112 each having a flat-headed fastener 114 having a shank which is adapted to be threadably received by a sleeve portion 116 having a pair of upwardly directed barbs. When shanks of the fasteners 114 are operatively received by the apertures 64,66, 68 and 70 and the corresponding tabletop openings 82,82 with which the apertures 64,66, 68 and 70 are aligned and tightened within the sleeve portion 116, the barbs thereof are drawn into the underside of the tabletop 20 to securely fasten the protector 12 thereupon. The heads of the fasteners 114,114 are so sized that when tightened so as to be operatively received by the countersunk regions 74,76, 78 and 80 of the platen portion 42, the fastener heads extend no higher than the side surface 72 of the platen portion 42.

Figure 5:
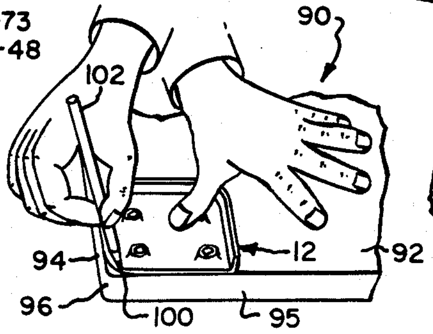
FIG. 5 is a perspective view of an embodiment of the protector of this invention being used as a pattern to conform the shape of a tabletop corner to that of a corner of the protector.

Inasmuch as the flange portion 44 of the protective body 12 is arcuately-shaped or rounded in accordance with the shape of the rounded corner 60 and flange 44 of the platen portion, a tabletop which defines substantially right corners must be conformed in shape to accommodate the rounded shape of the flange portion 44. For example, there is shown in FIG. 5 a wooden tabletop 90 defining a planar support surface 92 and including plastic edging 29 defining two adjacent edges 94,96 which meet at a blunt corner, indicated 96, which must be conformed in shape at the corner 96 for operatively accepting a protector 12. To conform the shape of the tabletop corner 96 as aforesaid, the protective body 12 is placed upon the corner 96 and in an inverted condition thereover so that the side edges 48 and 50 of the platen portion 42 is generally even with a corresponding one of the tabletop edges 95 and 94, respectively. At that point, the outline of the flange portion 44 and the rounded corner 62 of the protective body is traced along lines 98 (FIG. 6) and 100 (FIG. 5), respectively, of the tabletop surface 92 with a scribe 102 or suitable marker. Furthermore, tabletop holes 82,82 are either drilled as a drill bit is operatively directed through the apertures 64,66, 68 and 70 or the locations of the apertures 64, 66, 68 and 70 are marked at points on the tabletop surface 92 as the scribe 102 is inserted through the apertures 64,66, 68 and 70 for subsequent drilling of the holes 82,82. The protector 12 is thereafter removed, the top section 37 of the border edging 29 is cut away from the tabletop 20 at each edge 33 thereof with a knife or other suitable tool to expose the recessed side surface 36, and the tabletop corner 96 is rounded with a saw or suitable cutting tool as the blade of the cutting tool is directed along the marked line 100.

Figure 6:
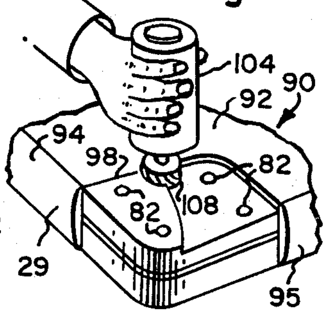
FIG. 6 is a perspective view of a table having its upper surface being routed so as to form a corner recess for accepting the protector of FIG. 5.

With reference to FIG. 6 and once the tabletop corner 96 has been rounded in conformity to the outline of the corner 62 of the platen portion 42, the tabletop upper surface 92 is subsequently cut or routed to a depth which is about equal to the thickness of the platen portion 42. Such a cutting or routing can be performed with an electric router 104 having a cutting tool 108. When routing the tabletop surface 92, the cutting tool 108 is confined to the area bounded by the tabletop edges 94,96 and the marked line 98. If preferred, a suitable template (not shown) can be used to isolate or identify during a routing operation the area of the tabletop surface 92 to be routed. The upwardly-directed openings of the holes 82 in the tabletop 90 are then countersunk with a drill and countersinking bit or other suitable tools.

Once the appropriate protector-accepting corner recess and countersunk holes 82,82 are formed in the tabletop 90 as aforesaid, the protector 12 is operatively placed upon the tabletop 90 and secured thereto with fasteners such as fasteners 110 of FIG. 2 having shanks which extend through the aligned apertures in the protector platen portion 42 and the countersunk holes 82. The resulting securement between the protector 12 and tabletop provides the tabletop corner with a strong, rigid flush-mounted overlay which protects the edges of the tabletop adjacent the corner thereof from damage.

The shape of the protector platen portion 42 and disposition of the apertures 64, 66, 68 and 70 thereover are advantageous in that they facilitate the conforming of the shape of a corner of the tabletop to accommodate the shape of the protector 12 and the identification of the tabletop locations with which the protector apertures 64, 66, 68 and 70 correspond when the protector 12 is operatively positioned upon the tabletop. More specifically, because shape of the platen portion 42 is generally symmetrical about an imaginary line 55 drawn between the corners 56 and 68 (FIG. 3), a conforming of a tabletop corner in accordance with the shape of the platen portion corner 62 conforms the tabletop corner in accordance with the shape of the platen corner 60 at which the flange portion 44 is joined to the platen portion 42. Furthermore, because the platen portion apertures 64,66, 68 and 70 are disposed over the platen portion 42 so as to be symmetrically arranged about an imaginary line 55 drawn between the corners 56 and 68, an identification of the locations on the table-top surface over which the platen portion apertures 64,66, 68 and 70 lie when the protector 12 is positioned in an inverted condition, as described above, on the tabletop surface identifies the locations on the tabletop surface over which the platen portion apertures 64,66,68 and 70 lie when the protector is operatively positioned on the tabletop surface.

The protector 12 provides a further advantage in that the flange portion 44 thereof helps to maintain the border edge 29 in operative position against the remainder of the tabletop when the protector 12 is operatively attached to the tabletop 20. More specifically and with reference again to FIG. 2, the leg 35 of the border edge 29, which remains wedged within the groove 31 when the top section 37 of the border edging 29 is cut away as aforedescribed, is covered by the flange portion 44 when the protector 12 is operatively attached at a tabletop corner 33 so that the leg 35, and hence the remainder of the border edging 29, is prevented from separating from the groove 31.

It will be understood that numerous modifications can be had to the aforedescribed embodiment without departing from the spirit of the invention. For example, although the protector embodiment 12 has been shown and described above as including a flange portion 44 which is relatively short so as to depend downwardly from the tabletop surface for a distance equal to only a fractional portion of the thickness of the tabletop when the protector 12 is operatively positioned thereupon, a protector embodiment in accordance with this invention may include a flange portion of sufficient size so as to depend downwardly from the tabletop surface for a distance which is about equal to the thickness of the tabletop when the protector is operatively positioned thereover. Accordingly, the aforedescribed embodiment is intended for the purpose of illustration and not as limitation.

I claim:

1. A method of installing a corner protector upon a tabletop or the like having two adjacent edges which meet at a corner, said method comprising the steps of:

providing a rigid protective body including a platen portion adapted to overlie a tabletop adjacent the corner thereof and a flange portion extending generally away from one side surface of said platen portion so that when said protective body is operatively positioned upon the tabletop, the flange portion extends generally downwardly from the platen portion so as to cover at least a portion of the tabletop edges at the tabletop corner, said platen portion defining a plurality of apertures disposed thereover;

forming a recess in the upper surface of the tabletop adjacent the corner thereof for receiving said platen portion when said protective body is operatively placed upon said tabletop, said recess being about equal in depth to the thickness of said platen portion of said protective body so that when said protective body is operatively placed upon said tabletop, the side surface of said platen portion opposite said one side surface is about even with the tabletop upper surface;

operatively positioning said protective body upon the tabletop and within said recess; and securing the protective body to the tabletop with fasteners having shanks for extending through the platen portion apertures and heads for holding the platen portion against the tabletop.

2. A method as defined in claim 1 wherein said step of forming a recess includes a step of cutting out the upper surface of the tabletop adjacent the corner to a depth which is about equal to the thickness of said platen portion.

3. A method as defined in claim 1 wherein said step of forming a recess is followed by the steps of forming holes through the tabletop which align with the platen portion apertures when said protective body is operatively positioned upon the tabletop and said method of securing includes the step of securing the fasteners through the formed holes so that the protective body is secured to the tabletop as the platen portion is tightly held between the tabletop and the heads of the fasteners.

4. A method as defined in claim 1 wherein the region of the platen portion surrounding each aperture is countersunk for accepting the head of a flat-headed fastener and the step of forming holes through the tabletop is followed by a step of countersinking the tabletop openings so that the countersunk regions of the platen portion are nestingly accepted by the countersunk openings of the tabletop when the protective body is operatively positioned thereover.

5. A method as defined in claim 1 wherein said platen portion of said protector body defines a first rounded corner which corresponds with the corner of the tabletop when the protective body is operatively positioned upon the tabletop and a second rounded corner positioned opposite said first rounded corner which conforms in shape and size to said second rounded corner and said step of providing a rigid protective body is followed by the steps of placing the protective body in overlying relationship with the tabletop so that said second rounded corner corresponds with the corner of the tabletop and conforming the shape of the tabletop corner to that of said first rounded corner so that the shape of the tabletop corner is thereby conformed to that of said second rounded corner.

* * * * *